United States Patent [19]

Menke et al.

[11] Patent Number: 5,019,199

[45] Date of Patent: May 28, 1991

[54] METHOD OF JOINING WOOD MATERIAL TO PLASTIC MATERIAL

[75] Inventors: Klaus Menke, Bruchsal; Peter Wiesert, Wiesbaden; Klaus Wollmann, Limburg; Bernd Best, Morfelden-Walldorf, all of Fed. Rep. of Germany

[73] Assignee: Erwin Behr GmbH & Co KG, Wendlingen/Neckar, Fed. Rep. of Germany

[21] Appl. No.: 336,326

[22] Filed: Apr. 11, 1989

[30] Foreign Application Priority Data

Apr. 19, 1988 [DE] Fed. Rep. of Germany ....... 3813025

[51] Int. Cl.$^5$ .................... B29C 45/00; B29C 45/16
[52] U.S. Cl. .................... 156/245; 144/346; 144/352; 264/328.1
[58] Field of Search .............. 156/245; 264/328.1; 114/358, 82; 144/332, 344, 346, 348, 352

[56] References Cited

U.S. PATENT DOCUMENTS

| 4,478,660 | 10/1984 | Landler et al. | 156/245 |
| 4,543,284 | 9/1985 | Baum | 156/245 |
| 4,582,887 | 4/1986 | Dominguez et al. | 264/328.1 |
| 4,591,155 | 5/1986 | Adachi | 156/245 |
| 4,600,192 | 7/1986 | Adachi | 156/245 |

FOREIGN PATENT DOCUMENTS 2114181 10/1972 Fed. Rep. of Germany .

Primary Examiner—Steve Alvo
Attorney, Agent, or Firm—Fisher, Christen & Sabol

[57] ABSTRACT

A method of joining wood material and plasstic material. An anchoring layer is applied to the area of the wood material that is to be joined to the plastic material and adhesively joined to the respective area which has a high specific surface area and with which the plastic material is joined by injection molding. The resultant composite material can be used in particular in the furniture sector and in housing construction, where low-cost and stable veneered plastic parts can be produced by the method, which can be made fire-proof by using appropriate plastic materials. Additional fields of application are the automobile industry, the construction of campers and boats, and aircraft construction. The wood material that is mainly used is veneer wood, because of the high quality of the visible surface of the composite.

2 Claims, No Drawings

METHOD OF JOINING WOOD MATERIAL TO PLASTIC MATERIAL

BACKGROUND OF THE INVENTION

1. Field of the Invention

The invention relates to a method of joining wood material to plastic material.

2. Background Art

As far as is known, wood and plastic materials are adhesively joined according to the state of the art. The bearing strength of the adhesive joint, however, is insufficient for many applications.

Broad Description of the Invention

The object of the invention is to provide a method which permits wood material, preferably veneer wood, to be permanently joined to an appropriate plastic material such that sufficient bearing strength for all practical applications is achieved.

To achieve this object, the invention method provides for applying an anchoring layer to the area of the wood material that is to be joined to the plastic material, and for adhesively joining said anchoring layer to the respective area, with said layer, that has a high specific surface area, being joined to the plastic material by injection molding.

Because of the high specific surface area of the anchoring layer, a very firm joint is reached between the injection-molded plastic material and the anchoring layer; this is due to the fact that injection molding permits the plastic material to penetrate deep into the anchoring layer which, thus, is practically enveloped by the plastic material. On the other hand, adhesives for joining the surface of the wood material to the anchoring layer are available which satisfy all requirements.

Materials that are suitable to be used as such anchoring layers are in particular fabrics or non-wovens, instead of these or in addition to these, however, also coarsely grained inorganic or organic fillers. All of these anchoring layers have in common that, in injection molding, they offer to the thermoplastic polymer material a large surface area for adhesion and mechanical anchoring. If coarsely grained inorganic or organic fillers are used, they are adhesively (permanently) joined to the wood material by means of an appropriate resin binder.

The method according to the invention, thus, permits composite parts to be produced which are both mechanically and thermally stable.

To avoid shrinkage during the processing of the plastic material, the procedure can be selected such that first the thermoplastic polymer material is injection-molded onto the non-woven or fabric layer, and subsequently the resultant composite part is adhesively joined to the wood part.

The non-woven or fabric layer that is to be joined is composed preferably of multifilament natural fibers, of fibers with rugged surface, or of synthetic composite fibers whose surface layer fuses when coming in contact with the liquid thermoplastic polymer material, thus being joined to the sprayed plastic material. The fabric or non-woven for the production of mechanically and thermally stable composite parts should have a high tensile strength, a high laminar strength and a high cross tensile strength. A certain elasticity and extensibility is necessary to compensate the shrinkage of the plastic material during cooling and to yield accordingly.

If a composite part is made of a thicker, rigid wood part, an elastic, preferably a cross-linking rubber adhesive is used, which is capable of compensating for the shrinkage and the resultant tensions.

To reduce the shrinkage of the plastic material and the deformation of injection-molded parts, one can use a stable glass or mineral fiber fabric or a non-woven as the only or an additional anchoring layer, if it satisfies the requirement of high tensile and in particular laminar strength.

Just as with all of the other layers, a glass or mineral fiber fabric has to be capable of being completely converted by the plastic material and thus result in an effective joint. The reinforcing effect exerted by such a covered glass fabric on the thermoplastic polymer material largely reduces shrinkage and prevents deformation of the composite parts, in particular if only a thin plastic layer is injection-molded.

It is advantageous to join such a glass fabric or non-woven layer by means of conventional adhesive-s on the basis of epoxy, polyurethane or acrylate resins as well as by means of nitrile, isoprene or chloroprene rubber adhesives cross-linked with isocyanate, to the wood parts to be joined, to veneer wood or to fabric layers that are already available.

Use of a fabric or non-woven made or synthetic composite fibers whose surface layer fuses is only conditionally suitable for the method according to the invention. A condition for the formation of a joint to the sprayed polymer material is that the fusing fiber surface is compatible with said sprayed polymer material and at least partly absorbed by it. However, if such a fabric is to be used for joining hydrophobic, anti-adhesive polyolefins, in particular polypropylene, it is in general not possible to join it by an adhesive to wood or other fabrics such that sufficient mechanical and thermal stability is reached.

It is advantageous to use monofiber or mixed-fiber cotton, wool, polyester or chemical wood pulp in a thickness from about 10 to 500 g/m$^2$, preferably 50 to 300 g/m$^2$ together with epoxy, polyurethane, acrylate or cross-linked rubber adhesives.

If a liquid adhesive is used which partly penetrates the non-woven or fabric, the demands on sufficient tensile and laminar strength are lower, in order to achieve high bond strength and firm joint. If, on the other hand, a thermosetting adhesive film on the basis of phenol, urea or epoxy resins is used, much higher strengths and masses per unit area of at least 60 g/m$^2$ are necessary to achieve stable joint.

If a non-woven or fabric layer that has a supporting or anchoring function is adhesively joined, e.g., to veneer wood, by means of a thermosetting adhesive film, the required anchoring effect is often not fully achieved in the subsequent injection-molding process because of the pressing of the anchoring layer on to the wood material. In this case, a firm joint can be produced advantageously by adhesively joining a second layer of stable glass fiber fabric or non-woven layer, using the above-mentioned liquid adhesives, or by applying an adhesion promoter with coarse-grained, preferably inorganic filler. Such an adhesion promoter is composed of a liquid, dissolved single- or multi-component natural or synthetic resin of high bond strength on the fabric or wood part to be coated, and of a hard inorganic or non-fusing thermally stable polymeric organic filler with a grain size of 0.1 to about 2 mm. Preferably, epoxy, polyurethane, phenol, urea or melamine resins can be used. In addition, it is possible to use cross-linking polyvinyl acetate, polyvinyl chloride or acrylate solutions or pastes. Suitable fillers are, e.g., silica sand or silicon carbide of appropriate grain size.

Such an adhesion promoter system can also be directly applied to the wood or used for joining by injection molding, but in the case of slightly thicker plastic parts it does not counteract shrinkage and thus deformation of the composite parts.

To produce a plastic-wood composite, a plastic material of low shrinkage during processing, e.g., thermoplastic composites filled with mineral powders or fibers, glass fibers, mica titanium dioxide or chalk pigments in proportions of 10 to 50 weight percent, can be used. It is possible to use any free-flowing raw materials that can be processed thermoplastically by injection molding, in particular polyolefins, polyamides, polyesters, polycarbonates, polyethers and blends.

Filled ABS or polyphenylene ether composite materials show the lowest shrinkage during processing and are suited even for the production of composites of complex shape.

Materials that are particularly advantageous for the method according to the invention are the low-cost thermoplastic composites on the basis of polypropylene of high mechanical and thermal stability and its blends.

To produce light foamed composite parts, it is advantageous to use plastic components containing foaming agents in one- or two-component injection-molding processes. In this case, foaming can be used to compensate shrinkage and avoid deformation of composite parts. A variant of this method, which avoids the problem of shrinkage of the plastic material during processing, involves the injection molding of the thermoplastic material onto a non-woven or fabric layer, with the subsequent adhesive joining to give the wood part of veneer wood.

According to the invention, adjustment of appropriate processing conditions permits the same types of fabrics or non-wovens and adhesives to be used, but preferably cotton, wool, blended polyester fabrics or stable pulp non-wovens of thicknesses between 100 and 500 g/m$^2$, are used and a liquid to pasty adhesive on the basis of epoxy, polyurethane, acrylate or cross-linked rubber resins is used. It should be noted in this context that the processing conditions for the plastic material have to be adjusted such that no bleed-through of plastic material occurs through the fabric or non-woven.

The injection molding can take place according to conventional and documented methods of joining fabric with plastic using injection-molding methods.

The composites produced from plastic and veneer wood by the method according to the invention can be cut, ground and painted. They are characterized by high mechanical strength, high thermal stability and high thermal shock resistance. These composites are preferably used in the automobile sector, in the construction of campers, boats and—with foamed plastic parts—also in aircraft construction. An additional large area of application involves the production of low-cost and stable veneered plastic parts for furniture and housing construction which, if appropriate plastic materials are used, can also be made fire-proof.

What is claimed is:

1. Method of joining wood material to plastic material, comprising the steps of:
    (a) injection molding a thermoplastic material onto an anchoring layer having a high specific surface to provide a composite, wherein a fabric or a non-woven is used as the anchoring layer, wherein the step of injection molding includes spraying thermoplastic material on one side of the anchoring layer leaving exposed another side of the fabric or non-woven surface under such conditions that no bleed-through of the thermoplastic material occurs through the fabric or non-woven;
    (b) applying an adhesive and adhesively joining the composite to the wood material, and wherein the step of adhesively joining includes joining the exposing side of the fabric or non-woven surface to the wood material.

2. Method as claimed in claim 1 wherein the anchoring layer contains coarsely grained inorganic or organic fillers.

* * * * *